US010062385B2

(12) United States Patent
Cook et al.

(10) Patent No.: US 10,062,385 B2
(45) Date of Patent: Aug. 28, 2018

(54) AUTOMATIC SPEECH-TO-TEXT ENGINE SELECTION

(71) Applicant: International Business Machines Corporation, Armonk, NY (US)

(72) Inventors: Alexander Cook, Rochester, MN (US); Manuel Orozco, Rochester, MN (US); Christopher R. Sabotta, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/281,228

(22) Filed: Sep. 30, 2016

(65) Prior Publication Data

US 2018/0096687 A1    Apr. 5, 2018

(51) Int. Cl.
*G10L 15/26* (2006.01)
*G10L 15/32* (2013.01)
(Continued)

(52) U.S. Cl.
CPC .............. *G10L 15/26* (2013.01); *G10L 15/01* (2013.01); *G10L 15/32* (2013.01); *G10L 19/0018* (2013.01)

(58) Field of Classification Search
CPC ..................................................... G10L 15/32
See application file for complete search history.

(56) References Cited

U.S. PATENT DOCUMENTS

| 5,754,978 A * | 5/1998 | Perez-Mendez ........ G10L 15/32 704/239 |
| 6,122,613 A * | 9/2000 | Baker ..................... G10L 15/32 704/235 |

(Continued)

FOREIGN PATENT DOCUMENTS

JP         4241376 B2       3/2009

OTHER PUBLICATIONS

Disclosed Anonymously, "A System and Method for Using Multiple Language Models in Parallel in Automatic Speech Recognition to Service Cross-Domain Queries," IP.com Prior Art Database Technical Disclosure, IP.com No. IPCOM000243489D, Sep. 24, 2015, pp. 1-3 http://ip.com/IPCOM/000243489.

(Continued)

*Primary Examiner* — Brian L Albertalli
(74) *Attorney, Agent, or Firm* — Nathan M. Rau (57) ABSTRACT

A system and method for selecting a speech-to-text engine are disclosed. The method includes selecting, by an engine selection component, at least two speech-to-text engines to decode a portion of computer-readable speech data. The portion of speech data can be decoded simultaneously by the selected speech-to-text engines for a designated length of time. In some embodiments portions of the speech data can be simultaneously decoded with selected speech-to-text engines at periodic intervals. An accuracy of decoding can be determined for each selected speech-to-text engine by an accuracy testing component. Additionally, the relative accuracies and speeds of the selected speech-to-text engines can be compared by an output comparison component. The engine selection component can then select the most accurate speech-to-text engine accurate to decode a next portion of speech data. Further, the engine selection module may (Continued)

select a speech-to-text engine that meets or exceeds a speed and/or accuracy threshold.

20 Claims, 6 Drawing Sheets

(51) Int. Cl.
  *G10L 19/00* (2013.01)
  *G10L 15/01* (2013.01)

(56) References Cited

U.S. PATENT DOCUMENTS

| | | | | |
|---|---|---|---|---|
| 6,662,157 | B1* | 12/2003 | Horowitz | G10L 15/19 |
| | | | | 704/235 |
| 6,963,834 | B2 | 11/2005 | Hartley et al. | |
| 7,228,275 | B1* | 6/2007 | Endo | G10L 15/32 |
| | | | | 704/231 |
| 8,005,677 | B2 | 8/2011 | Cutaia | |
| 8,332,226 | B1* | 12/2012 | Rahim | G10L 15/30 |
| | | | | 704/231 |
| 8,886,540 | B2 | 11/2014 | Cerra et al. | |
| 9,269,354 | B2* | 2/2016 | Gandrabur | G10L 15/1815 |
| 9,431,005 | B2* | 8/2016 | Ljolje | G10L 15/285 |
| 9,484,028 | B2* | 11/2016 | Vermeulen | G10L 15/32 |
| 9,530,103 | B2* | 12/2016 | Fastow | G10L 15/32 |
| 2002/0194000 | A1* | 12/2002 | Bennett | G10L 15/32 |
| | | | | 704/270 |
| 2004/0015350 | A1* | 1/2004 | Gandhi | G10L 15/01 |
| | | | | 704/235 |
| 2005/0177371 | A1* | 8/2005 | Yacoub | G10L 15/32 |
| | | | | 704/270.1 |
| 2005/0246175 | A1* | 11/2005 | Creamer | G10L 15/32 |
| | | | | 704/270.1 |
| 2006/0009980 | A1* | 1/2006 | Burke | G10L 15/30 |
| | | | | 704/270 |
| 2007/0038445 | A1* | 2/2007 | Helbing | G10L 15/1822 |
| | | | | 704/235 |
| 2010/0004930 | A1* | 1/2010 | Strope | G10L 15/32 |
| | | | | 704/240 |
| 2011/0295603 | A1* | 12/2011 | Meisel | G10L 15/07 |
| | | | | 704/246 |
| 2013/0272511 | A1* | 10/2013 | Bouzid | H04M 3/493 |
| | | | | 379/88.01 |
| 2014/0163977 | A1* | 6/2014 | Hoffmeister | G10L 15/32 |
| | | | | 704/232 |
| 2014/0180689 | A1 | 6/2014 | Kim | |
| 2015/0081270 | A1 | 3/2015 | Kamatani et al. | |
| 2015/0348539 | A1* | 12/2015 | Yamamuro | G10L 15/26 |
| | | | | 704/251 |
| 2016/0055850 | A1* | 2/2016 | Nakadai | G10L 15/32 |
| | | | | 704/235 |
| 2017/0076726 | A1* | 3/2017 | Bae | G10L 15/22 |
| 2017/0092275 | A1* | 3/2017 | Chang | G10L 15/32 |

OTHER PUBLICATIONS

Huang et al., "Learning Deep Structured Semantic Models for Web Search using Clickthrough Data," CIKM '13: Proceedings of the 22nd ACM international conference on Information & Knowledge Management, Oct. 2013, 8 pages, ACM.

Mell et al., "The NIST Definition of Cloud Computing," Recommendations of the National Institute of Standards and Technology, Special Publication 800-145, Sep. 2011, 7 pages, National Institute of Standards and Technology, Gaithersburg, MD.

* cited by examiner

AUTOMATIC SPEECH-TO-TEXT ENGINE SELECTION

BACKGROUND

The present disclosure relates to speech recognition and, more specifically, to adjusting the settings of automatic speech to text engines in real time.

Automatic speech recognition is a method of converting an audio signal, such as spoken language, that has been received by a computer or system to text. This conversion can employ speech-to-text engines that use algorithms implemented through computer programs to automatically generate a sequence of words based on the audio signal. One use of speech-to-text engines is in allowing people to communicate with digital devices, such as smartphones and digital assistants. Speech-to-text engines can also aid those with disabilities such as hearing loss by automatically captioning speech in classrooms, films, phone calls, etc. Another use of speech-to-text engines is in recording telephone calls so that information can be gleaned from their contents. Speech-to-text engines can vary, and different engines may be appropriate in different contexts. For example, speech-to-text engines can be trained to recognize particular languages, accents, and vocabularies. Additionally, some speech-to-text engines may have different speeds and levels of accuracy. Variations in engines can result in variations in the amount of processing power required to convert the speech to text.

SUMMARY

Various embodiments are directed to a method for selecting a speech-to-text engine while carrying out speech recognition processes in real time. This can include simultaneously decoding a portion of speech data with more than one speech-to-text engine. These speech-to-text engines can be analyzed by an accuracy testing component and an output comparison component in order to determine how accurate and/or processor intensive they are. Instructions directing how and when the analyses will occur may be stored in decoding settings. Additionally, one or more of these tested speech-to-text engines can be selected, by an engine selection component, to decode a next portion of speech data based upon various criteria, and these criteria can also be stored in decoding settings. The criteria can include how accurate a speech-to-text engine is, as well has how fast, or processor intensive, it is. In some cases, speed and accuracy thresholds may be set, and the determination of whether or not a speech-to-text engine will be selected may be based upon how the speech-to-text engine's output compares to these thresholds.

DETAILED DESCRIPTION

The process of automatic speech recognition described herein involves automatically selecting speech-to-text engines in real time. More than one speech-to-text engine can be simultaneously used in the process of automatic speech recognition, and the accuracy and speed of these engines can be determined. Then, speech-to-text engines that decoded portions of speech data with desired levels of accuracy and/or speed can be selected from the speech-to-text engines that were used simultaneously. This selection can occur one or more times during the speech recognition process in order to tune the use of the speech-to-text engines.

The decoded speech data produced by the selected speech-to-text engines can be used in various applications. One example of an application may involve information retrieval in the context of a telephone conversation. In an example such as this, a representative of a company may call a potential customer. Over the course of the call, the potential customer may ask about a particular product or service, and a speech-to-text engine can detect keywords related to their inquiry. This can trigger a computer system to retrieve information on the topic and display it to the company representative, thereby facilitating their ability to provide the potential customer with more information. Additional examples of how decoded speech data can be used, according to embodiments of the present disclosure, are discussed below.

Figure 1:
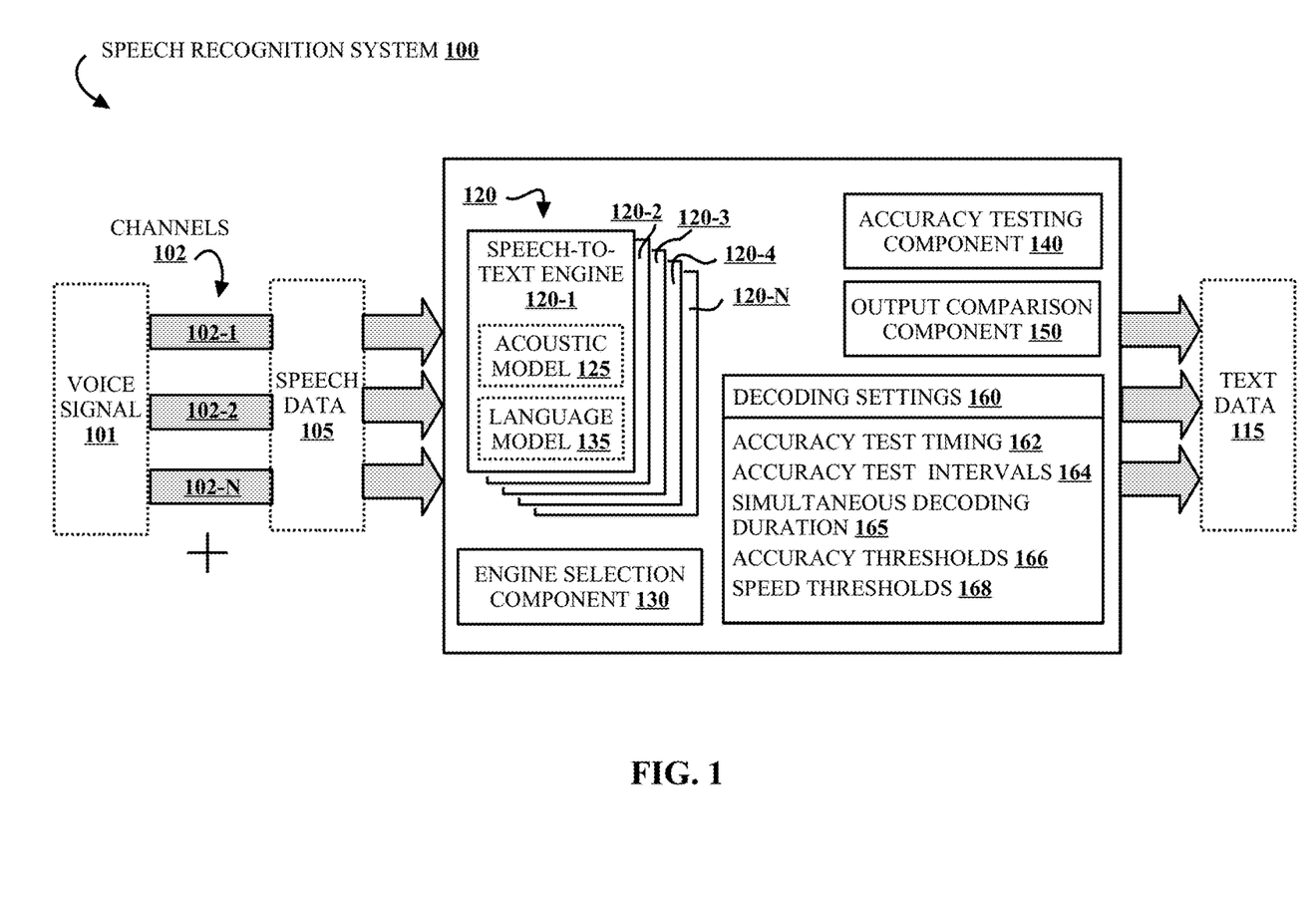
FIG. 1 is a block diagram illustrating a speech recognition system, according to some embodiments of the disclosure.

FIG. 1 is a block diagram illustrating a speech recognition system 100, according to some embodiments. The speech recognition system 100 carries out processes of converting computer-readable speech data 105 to output text data 115. Audible input 101 can be a source of the speech data 105 and can be spoken language transformed to data (e.g., digitally encoded, or in an analog format) that a processor can process. Audible input 101 can come from a variety of sources and may be recorded and processed in different ways. Audible input 101 may be any form of speech, such as live or prerecorded speech. Audible input 101 can also be synthesized speech, such as speech generated by a computer. Audible input 101 may, for example, include conversations on a telephone call, speech dictated into a recording device, recorded voices in a television show or movie, etc. Audible input 101 can be digitized, and the resulting computer-readable speech data 105 can be analyzed in subsequent steps.

The audible input 101 is received by at least one channel, 102-1, 102-2, 102-N, illustrated in FIG. 1, and generically referred to as 102. A channel can be any type of transmission medium, such as a wire, cable, optical fiber, etc. In some cases, one or more audible input 101 may be recorded on a single channel 102, and in others, one or more audible input may be recorded on separate channels 102. FIG. 1 illustrates one speech recognition system 100. However more than one system can be employed in some embodiments. Additionally, while three channels are illustrated in FIG. 1, there may be a more, or fewer, channels 102 in some embodiments.

The speech recognition system 100 illustrated in FIG. 1 can decode received speech data 105 using one or more speech-to-text engines 120-1, 120-2, 120-3, 120-4, 120-N, herein referred to generically as 120, an engine selection component 130, an accuracy testing component 140, an output comparison component 150, and decoding settings 160. Components in FIG. 1 can be software, hardware, or combinations thereof.

Speech-to-text engines 120 can be used to decode spoken language that has been converted to computer-readable speech data 105. Each of the speech-to-text engines 120 can operate at varying speeds and/or with varying levels of accuracy, and they may employ assorted models when decoding speech data 105. Two examples of these models, an acoustic model 125 and a language model 135, are illustrated in FIG. 1 as being included in speech-to-text engine 120-1.

The speech data 105 received by the speech recognition system 100 can be segmented into smaller portions. This may involve breaking the speech data 105 into chunks, which are often referred to as "frames." One approach to segmenting speech data 105 is to break it into frames of a fixed length of time or data. A common frame length is 10 milliseconds. However, other frame lengths can be used. Though breaking speech data 105 into frames is one exemplary method of segmentation, other approaches can be used as well. For example, speech data 105 can be broken into sections that are determined likely to be individual words or phrases.

Processing of the segmented speech data 105 by the speech-to-text engines 120 can additionally use models for detecting and recognizing features of the speech data 105. Two examples of models that may be used, an acoustic model 125 and a language model 135, are shown in the speech-to-text engine 120-1. The acoustic 125 and language 135 models are examples of models that can be used, but other models can be used as well. Examples of other models that can be used may include phonetic word models, language models, sentence models, etc., which can detect various other elements of speech and recognize various other features of the speech data. Additional models and steps may be involved and, in some embodiments, models and steps that are discussed herein may be omitted.

The acoustic model 125 enables the system 100 to detect and interpret features of individual sounds that comprise the speech data 105. An acoustic model 125 can represent the relationship between the audible input 101 and individual units of sound (e.g., language features such as phonemes, words, phrases, sentences, etc.). An acoustic model 125 may be trained by comparing a set of audio recordings to pre-existing transcripts of those recordings. Based on these comparisons, statistical representations of sounds that make up different features of a language can be created. An artificial neural network, such as a convolutional neural network, is an example of an acoustic modeling approach that can classify units such as individual sounds and words. Other approaches can also be used, such as a Hidden Markov Model (HMM), lattice based analysis, entropy based speech segmentation algorithms, CMUSphinx, etc. In some examples, features of recorded sound may be matched to particular words or other sounds recognized by an acoustic model 125.

In order to enhance the accuracy of an acoustic model 125, the model 125 can be trained to recognize common features in speech data 105. Some of these features may interfere with the clarity of the recorded speech. Ambient noises, such as noises from wind or automobiles, are examples of possible interfering features. If an acoustic model 125 is trained to recognize and filter out this noise, sounds that are meant to be recognized, such as language features, can be isolated. For example, isolating language features in speech data 105 can facilitate its conversion to text data 115.

Additionally, an acoustic model 125 can be trained to recognize variations in the audible features of speech. This training may be accomplished in various ways. One approach is to record one or more people reading a scripted statement aloud, and then compare the spoken statement to its written transcript. In some embodiments, an acoustic model 125 may be trained to recognize particular accents. For example, at least one person with an Irish accent can be recorded reading scripted statements in order to train an acoustic model 125. This acoustic model 125 may then be particularly effective in decoding language spoken in an Irish accent. A model 125 such as this can be employed by a call center in Ireland. For even greater specificity, an acoustic model 125 can be trained to recognize a particular person. In one example, a person working in a call center may recite a scripted statement before they begin work. This may allow a speech-to-text engine 120 operating on the channel 102 recording the person's speech to recognize the sound of their individual voice more easily.

Speech-to-text engines 120 can further decode speech data 105 with the aid of a language model 135. In FIG. 1, a language model 135 is illustrated within engine 120-1. A language model 135 can provide context that helps distinguish between words or phrases that sound similar to one another. In some embodiments, this can be done by using statistical models to estimate the probability of a word appearing in a particular context. A language model 135 can employ many of the same approaches to decoding as an acoustic model 125, including a Hidden Markov Model (HMM). A Hidden Markov Model can, based on context provided by a given set of words and phrases, predict which unobserved words and phrases may be likely to appear.

In one example, a language model 135 may predict that words like "airplane" and "travel" are frequently found with words like "airport" and "baggage." This can allow the language model 135 to determine the difference between two possible interpretations of words or phrases recognized by an acoustic model 125. For instance, a speech-to-text engine 120 decoding a portion of speech data 105 may produce two alternate text interpretations: "I'll travel with my baggage on the airplane" and "I'll travail with my bag age on the airplane." The two interpretations differ in the words "travel" and "travail," as well as "baggage" and "bag age." However, both interpretations include the word "airplane." Because the word "airplane" may be known by the language model 135 to be commonly found with words like "travel" and "baggage," the model 135 may determine that the first interpretation is more likely to be correct.

A language model 135 can be trained in manner similar to that of an acoustic model 125. For example, in addition to training an acoustic model 125 with recordings of scripted statements spoken by people with Irish accents, as was discussed above, a language model 135 can be trained to recognize particular words and grammatical structures that are common to English as it is spoken in Ireland. One approach to this training is to enter into the model 135 examples of words, sentences, and grammatical conventions common in this region. These examples can be in the form of spoken language or text and may be entered by a user.

Speech-to-text engines 120 can require varying levels of power from a processor included in, for example, a computer, to perform the associated analysis. In many cases, speech-to-text engines 120 that are less processor intensive (i.e., demanding of processor resources or processing time)

are faster than more processor intensive engines, though greater speed may result in less accuracy. The speech recognitions system 100 illustrated in FIG. 1 has multiple speech-to-text engines 120 available for decoding speech data, and these speech-to-text engines 120 can operate at varying speeds. At times, it may be desirable to sacrifice accuracy for lower processing power requirements. To do this, speech-to-text engines 120 with appropriate accuracy and processing power are selected by an engine selection component 130.

The engine selection component 130 carries out processes of determining which of a set of available speech-to-text engines 120 may be used to decode speech data 105. In some embodiments, it selects more than one speech-to-text engine 120 to simultaneously decode a portion of speech data 105. The engine selection component 130 may arbitrarily select which speech-to-text engines 120 to use or, as will be discussed in greater detail below, the speech-to-text engine selection model 130 may select speech-to-text engines 120 based upon criteria stored in decoding settings 160. These criteria can include measures of the accuracy, processing power required, and speed of the engines 120.

In order for a speech-to-text engine selection component 130 to select speech-to-text engines 120 based upon their accuracy, the accuracy of the speech-to-text engines 120 may first be determined by an accuracy testing component 140. FIG. 1 illustrates an accuracy testing component 140 that can carry out processes of determining the accuracy of decoded speech data 105. The accuracy of decoded speech can be determined by various approaches. In some embodiments, a baseline for accuracy may be set by having a person read a statement with known text (e.g., a scripted statement). The speech data 105 from this reading can then be decoded by speech-to-text engines 120 in a speech recognition system 100. For example, a speech-to-text engine among the engines 120 that is able to correctly match every spoken word to the known text can be assigned an accuracy level of 100%, and engines 120 with fewer correct matches can be assigned correspondingly lower accuracy levels. In other embodiments, accuracy may be measured in different ways and may not necessarily be reported as a percentage.

There are multiple factors that can determine how accurate, and thus how fast or processor intensive, a speech-to-text engine 120 is. In some cases, the model or models (e.g., acoustic 125 and language 135 models) used by the engine 120 can be a factor. For example, one speech-to-text engine 120 may use a model that tests a larger vocabulary than that of another engine 120. The engine 120 that uses a larger vocabulary to decode words may be more accurate because testing a greater number of words can provide more chances to find words that properly match portions of the speech data 105. However, going through a large pool of words can slow down the speech-to-text engine 120 and can also be more processor intensive.

Another factor in the speed and accuracy of a speech-to-text engine 120 can be the depth of its search. For example, one engine among the engines 120 can test ten possible matches for one spoken word, while another engine among the engines 120 can test one-hundred possible matches. This can be the case even if two of the speech-to-text engines 120 have the same vocabulary size. One of the engines 120 that tests one-hundred possible matches is likely to be more accurate than one of engines 120 that tests fewer possible matches, but, as in the case of the engine that has a larger vocabulary, this can take more time and require more processing power.

The speech-to-text engine 120 appropriate for a given situation can vary. For example, decoding the speech of someone communicating in a second language may require a slower, more processor intensive speech-to-text engine 120 than decoding the speech of someone using their native tongue would. In the case of a person whose speech is more easily understood, a less processor intensive engine 120 may be sufficient and the decoding process can be faster, while achieving a similar level of accuracy.

Additionally, there may be contexts in which a high level of accuracy is not necessary, allowing for the use of a faster speech-to-text engine 120. An example of this can involve a company recording telemarketing calls. The company may want to record the calls in order to collect information from statements made by potential customers. It may be known that, in the beginning of a call, the telemarketer recites a scripted introduction. During this portion of the call, a processor intensive speech-to-text engine 120 may not be required because a faster one may be adequate for decoding an expected statement. In some cases, the company may not be particularly interested in the scripted portion of the call, as it does not contain useful information from the potential customer, and so may be satisfied with a less accurate transcription.

The accuracy of the decoded speech data 105 produced by the speech-to-text engines 120, as determined by the accuracy testing component 140, can be analyzed by an output comparison component 150. The output comparison component 150 can compare the accuracy of language decoded by two or more speech-to-text engines 120. The output comparison component 150 can also determine which of the portions of speech data 105 was decoded most quickly, thereby using the least amount of processing power. This information may be used in order to determine which speech-to-text engines 120 will be used to decode subsequent portions of speech data 105. The speech-to-text engines 120 to be used in the future may be chosen by the engine selection component 130. For example, the engine selection component 130 may select the engine 120 that is the most accurate or the engine 120 that decoded the most quickly.

The accuracy testing and output comparison may be carried out at various points during the conversion of speech data 105 to text data 115. For example, the accuracy of multiple speech-to-text engines 120 may be tested at the beginning of a sample of speech data 105, such as that of a telephone call. The engine selection component 130 may then select one engine to be used for the remainder of the speech data 105. In some embodiments, a speech-to-text engine 120 may be chosen based on its accuracy or processing power requirements. It may be the case that a speech-to-text engine 120 will only be selected if it meets or exceeds an accuracy or speed threshold. Criteria for selecting speech-to-text engines 120 may be stored in decoding settings 160.

Instructions specifying when to carry out accuracy testing can also be stored in the decoding settings 160. In some cases, it may be desirable to change speech-to-text engines 120 at a time during the decoding of a portion of speech data 105 other than the start. This can be accomplished by testing the accuracy of multiple speech-to-text engines 120 at some assigned time or times during the decoding process. Additionally, this testing may occur at regular intervals.

In some embodiments, the engine selection component 130 may select speech-to-text engines 120 based on criteria other than accuracy and processing power. These criteria can be particular sets of vocabulary or keywords. In some embodiments, entities using speech-to-text engines 120 to decode speech data 105 may be interested only in particular types or categories of speech. For example, a polling organization may use speech-to-text engines 120 to collect transcripts of speech data 105 from calls made by its representatives. The organization may be more interested in obtaining information from the people being polled than the representative asking the predetermined questions. A list of keywords indicating a particular category of speech can be input into the decoding settings 160 in order to aid the system in distinguishing between the representatives and the people being polled. In some embodiments, if keywords from a scripted statement or question spoken by the representative are detected, then less accurate, faster speech-to-text engines 120, or even no speech-to-text engines at all, may be used during that portion of the call. If the slower speech-to-text engines 120 are used only when the system detects keywords indicative of a statement made by the person being polled, or in the absence of keywords indicative of scripted speech, the overall process may be less processor intensive.

As is discussed above, the decoding settings 160 in the speech recognition system 100 can contain instructions that can direct the process of speech-to-text engine 120 selection. These instructions can include the time or times at which accuracy testing will be conducted 162, the length of intervals between accuracy tests 164 as the speech data 105 is being decoded, and the duration of simultaneous decoding 165. Criteria used to by the speech-to-text selection component 130 to determine which engine 120 to employ can also be stored in the decoding settings 160. These criteria can include accuracy level thresholds 166 and speed thresholds 168. The thresholds can be upper and lower bounds of levels of accuracy and speed that are acceptable to the system. In some embodiments, these settings may be input by a user.

The text data 115 that is output by the speech-to-text engines 120 after decoding the speech data 105 can be used for various purposes. For example, the text 115 can be displayed to a viewer. In some cases, text 115 may be displayed as the speech data 105 is decoded in real time. Examples of displaying real time text data 115 to a viewer include closed-captioning of live or recorded events and programs, captioned telephone calls, language translation applications, etc.

In other embodiments, the text data 115 may not be displayed. One example of this may be when a person is vocally communicating with a digital assistant. In a case such as this, a user may ask their digital assistant where the nearest restaurant is. This can trigger the digital assistant to look up a restaurant and display the results of the search without displaying the text translation of the user's question. Another example may be when medical professionals record spoken notes with a dictation device. The speech data 105 from these notes can be decoded and saved as text data 115. Recording notes spoken aloud may be faster than writing them down, but storing notes as text data 115 can make the notes more easily stored and/or cataloged. Additionally, the text data 115 can be used to trigger a computer system to locate and optionally display selected information. In a case involving a representative of a retail company and a customer, speech data 105 from a recorded telephone conversation can be converted to text data 115. The text data 115 may indicate that the customer has asked a question about a particular product. This can trigger the system to display information about that product for the company representative, allowing them to better inform the customer.

Figure 2:
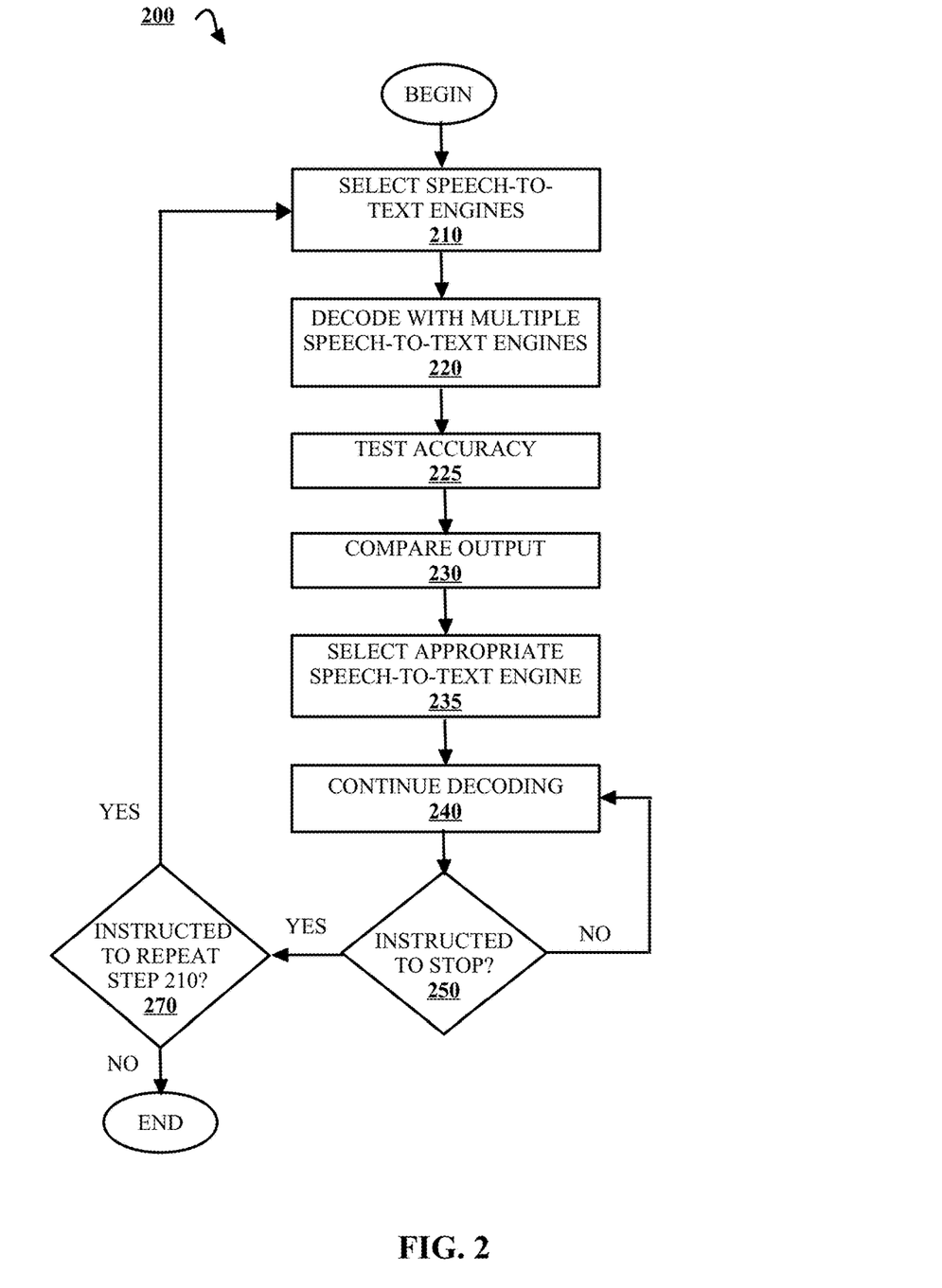
FIG. 2 is a flow diagram illustrating a speech-to-text decoding process, according to some embodiments of the disclosure.

FIG. 2 is a flow diagram illustrating a speech-to-text decoding process 200, according to some embodiments. Process 200 is illustrated as being carried out by a single actor, but, in other embodiments, the process may be carried out by multiple actors. The process 200 begins when a portion of speech data 105 is entered into in the speech recognition system 100. The speech data 105 can come from an audible input 101 that was converted to computer-readable speech data 105, as described with respect to FIG. 1. In step 210 of process 200, speech-to-text engines are selected in order to test the speech data 105.

In some embodiments, all available speech-to-text engines 120 may be selected by an engine selection component 130 in step 210, and, in other embodiments, only a portion of the engines 120 may be selected. In one example, speech-to-text engines 120 may be selected because they are at or below a maximum processing power requirement, or speed, threshold. This may be the case when a speech recognition system 100 strives for the greatest accuracy possible within particular processing power constraints. The speech-to-text engines 120 selected in step 210 are used to simultaneously decode the speech data 105 in step 220. The amount of time allotted for this simultaneous decoding can be designated by a user and stored in decoding settings 160.

The speech 105 decoded in step 220 is analyzed for accuracy by, for example, an accuracy testing component 140 in step 225. Then, in step 230, samples of decoded speech produced by each speech-to-text engine 120 are compared to one another by an output comparison component 150 in order to determine which speech-to-text engine 120 is the most accurate. In step 235, a speech-to-text engine 120 is selected. In some embodiments, a speech-to-text engine 120 may be selected if it is the most accurate of the tested engines 120.

The speech-to-text engine 120 selected in step 235 decodes the next portion of speech data 105 in step 240, which continues until the system 100 instructs it to stop. In step 250, it is determined whether there are instructions for stopping step 240 of the decoding process 200. These instructions can be stored in decoding settings 160. In one example, step 240 may be instructed to stop because the portion of speech data 105 has ended. In another example, step 240 may be instructed to stop because the speech data is to be again decoded by multiple speech-to-text engines 120, which are selected in step 210, in a repeat of step 220.

In step 270, it is determined whether there are instructions directing the speech recognition system 100 to repeat step 210. These instructions can also be stored in the decoding settings 160. If there are instructions directing the system to repeat step 210, process 200 returns to step 210, and speech-to-text engines are again selected to decode the next portion of speech data 105 in a repeat of step 220. If, in step 270, it is determined that step 210 is not to be repeated, process 200 ends.

An example in which speech data 105 can be decoded by the speech recognition system 100 of FIG. 1 in a manner such as that illustrated by FIG. 2 may involve an insurance company that uses call centers in various regions of the United States. People from different regions frequently speak with different accents and dialects, and it may be appropriate to take this into account when company representatives make phone calls. In this example, a representative of an insurance company and a person to whom they're speaking may be from different parts of the country and have different dialects. Because of this, difficulties may arise in communication between the two people. It may be that a customer from Massachusetts calls the company and reaches a central call routing line. As described in FIG. 2, multiple speech-to-text engines can begin decoding at the start of the call. This decoding can continue for a length of time specified in decoding settings 160.

In this example, it can be determined that a speech-to-text engine 120 with an acoustic model 125 and a language model 135 trained on a dialect typical of Massachusetts is the most accurate. Based on this determination, the customer's call can be routed to a call center in or around Massachusetts, which may allow both the customer and the company representative to more easily understand one another. Additionally, a call center in this region may use a greater number of speech-to-text engines 120 with models trained on a Massachusetts dialect. Because of this, if the customer is transferred to that call center, faster, less processor intensive speech-to-text engines 120 may decode with a desired level of accuracy, allowing them to be selected by the speech-to-text engine selection component 130.

Another example of a speech-to-text decoding process 200 can involve a situation in which two people on a phone call use different vocabularies because of their different interests or areas of expertise. In an example involving a university, the university offices may receive phone calls from board members, prospective students, job applicants, building contractors, etc. The university can use a variety of speech-to-text engines 120 that have models trained on different vocabularies, such as those related to finances, salaries, study abroad programs, etc. If, for example, a prospective student called with questions about study abroad programs, a speech-to-text engine 120 with a language model 135 trained on an appropriate vocabulary may be automatically selected in process 200. This can allow faster, less processor intensive engines 120 to be used. Recall that a speech-to-text engine 120 may be faster when it does not have to test as many possible words from its stored vocabulary. If a speech-to-text engine 120 uses a language model 135 that includes a greater percentage of vocabulary related to a topic being discussed on the call, it may be less processor intensive.

As stated above with respect to FIG. 1, audible input 101 can be received by one or more channels 102. In some examples, when more than one person is being recorded, such as in the case of a telephone call, each person is recorded on a separate channel 102. This can allow different speech-to-text engines 120 with different models (e.g., acoustic models 125 and language models 135) to be used for individual speakers. Using different speech-to-text engines 120 for individual speakers may account for variations in the speakers' audible input 101. That is, an Irish person can be talking to a Scottish person while each person's speech 105 is decoded by different speech-to-text engines 120 having models trained on their particular accents and vocabularies.

In other examples, multiple audible input 101 may be recorded on a single channel 102. In cases such as these, there may be times when the voice 101 of one speaker is more difficult to decode than that of another speaker. For example, two people may be on a channel with speech-to-text engines 120 that have Australian English acoustic 125 and language models 135. If one of these people is from Scotland, the Australian speech-to-text engines 120 can have difficulty decoding that person's Scottish dialect, thus requiring the use of slower, more processor intensive, speech-to-text engines 120. However, if the speech recognition system 100 determined that the accents were different, the call can be rerouted to a call center located in the Scotland so that both speakers are Scottish, and speech-to-text engines 120 more prepared for decoding Scottish English can carry out the remainder of the decoding. This may have the effect of making the decoding process 200 faster and less processor intensive.

Figure 3:
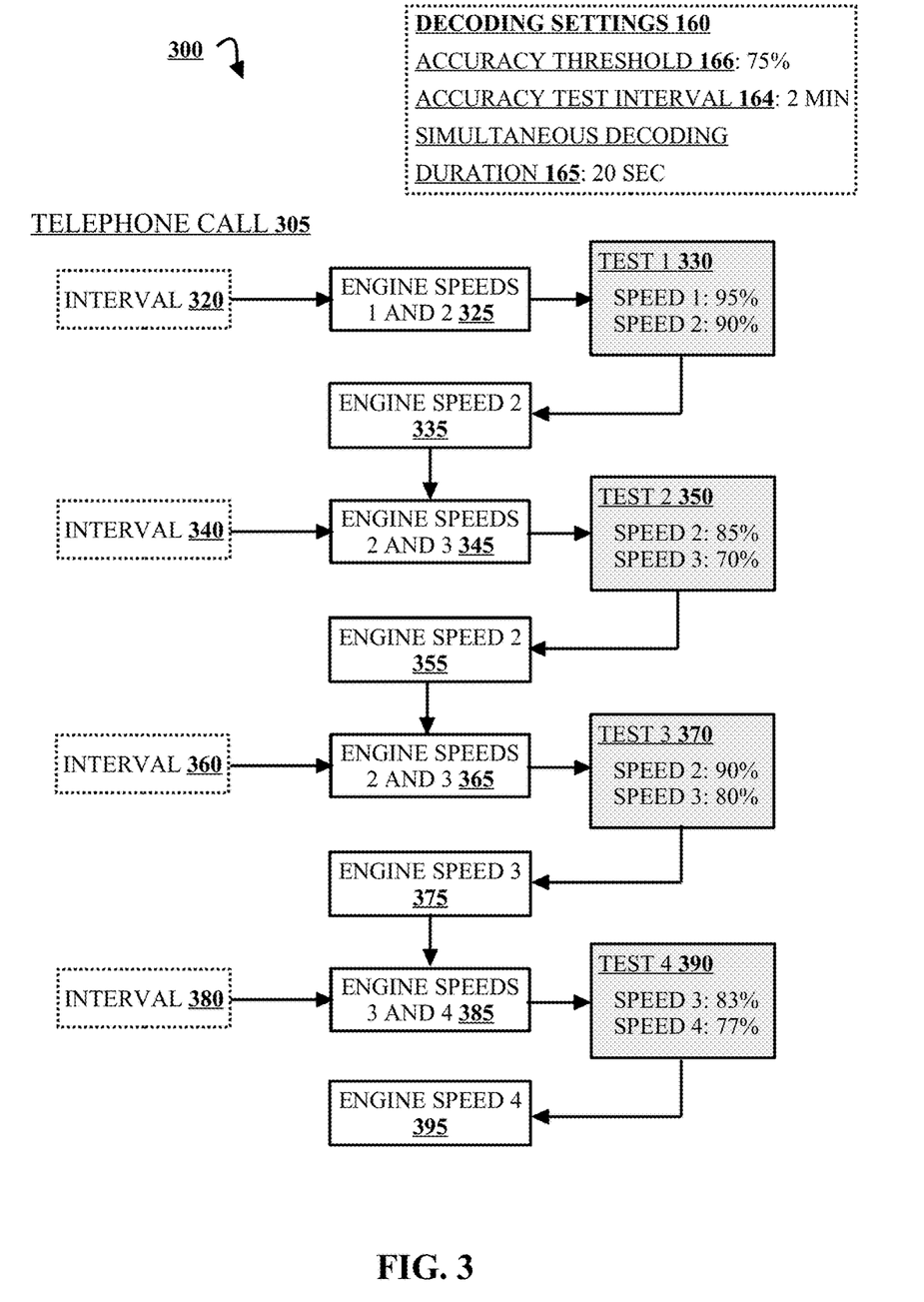
FIG. 3 is a flow diagram illustrating an exemplary speech-to-text decoding process operating during telephone call, according to some embodiments of the disclosure.

FIG. 3 is a flow diagram illustrating an exemplary speech-to-text decoding process 300 operating during telephone call 305, according to some embodiments. To illustrate process 300, but not to limit embodiments, FIG. 3 is described within the context of system 100 of FIG. 1. Where elements shown in FIG. 3 are identical to elements shown in FIG. 1, the same reference numbers are used in both Figures. Process 300 involves the decoding of speech data 105 recorded during a telephone call 305 in a manner similar to that of process 200, which is illustrated in FIG. 2. At periodic intervals throughout the call 305, the speech data 105 is temporarily decoded by two different speech-to-text engines 120 at once.

The decoding settings 160 shown in FIG. 3 illustrate examples of decoding settings 160 that provide instructions for decoding the call 305. These decoding settings 160 instruct the speech recognition system 100 to simultaneously decode with multiple engines 120 at periodic intervals. The decoding settings 160 also instruct the system 100 to carry out this multiple engine 120 decoding step for a duration 165 of twenty seconds. Additionally, the accuracy threshold 162, stored in the decoding settings 160 indicates that, for a speech-to-text engine to be selected, an accuracy test must show that it has an accuracy of 75% or greater. If both speech-to-text engines 120 are at or above this threshold, the more accurate of the two may be selected.

When the call 305 begins 320, it is simultaneously decoded by an engine operating at speed 1 and a second engine operating at a faster pace (engine speed 2) in step 325. A first test of the accuracy of engine speeds 1 and 2 is then performed in step 330. In this step, it is found that the speech-to-text engine operating at speed 1 has an accuracy of 95%, and the speech-to-text engine operating at speed 2 has an accuracy of 90%. Both of these accuracy levels exceed the accuracy threshold of 75%, making them sufficiently accurate, according to the decoding settings 160. Because engine speed 2 is sufficiently accurate, and is, additionally, the faster of the two, it is selected to continue decoding process 300 in step 325.

At interval 340, the call is decoded at engine speed 2 as well as a third, faster, speech-to-text engine (engine speed 3) in step 345. A second accuracy test is then performed in step 350, this time to find the accuracy levels of engine speeds 2 and 3. At interval 340, the speech-to-text engine operating at speed 2 has an accuracy of 85%, and the speech-to-text engine operating at speed 3 has an accuracy of 70%. Speed 2 meets the accuracy threshold of 75%, though its accuracy has decreased since the previous accuracy test in step 330. This decrease can be the result of changes in the audible input 101, such as variations in volume or speed. Speed 3 does not meet or exceed the accuracy threshold of 75%, and the call continues to be decoded with the speech-to-text engine operating at speed 2 in step 355.

At interval 360, the call 305 is again decoded with speech-to-text engines 120 operating at speeds 2 and 3 in step 365. The accuracy levels of engine speeds 2 and 3 are then tested in step 370. In this example, it's found that, at interval 360, speed 2 has an accuracy level of 90%, and speed 3 has an accuracy level of 80%. Because speed 3 now exceeds the accuracy threshold of 75%, the call is decoded with the speech-to-text engine operating at speed 3 in step 375 until the next interval 380.

At interval 380, the call 305 is decoded with a speech-to-text engine operating at speed 3, as well as a faster speech-to-text engine operating at speed 4, in step 385. In step 390, speed 3 is found to have an accuracy level of 83% and speed 4 an accuracy level of 77%. Because speed 4 exceeds the accuracy threshold of 75%, and is the faster of the two, the call continues to be decoded at speed 4 in step 395. Process 300 may continue in this manner until it is instructed to finish or until the portion of the call designated for decoding has ended. This testing and tuning can allow the least processor intensive speech-to-text engines to be used whenever possible (e.g., when they are sufficiently accurate).

In some examples, it may be that none of the speech-to-text engines 120 meets an accuracy threshold. If so, the decoding can optionally cease, switch to a different speech-to-text engine 120, or continue with the current engine 120; though, other actions can be taken as well. In some embodiments, if the decoding of a telephone call is ceased, the call may be dropped. In other embodiments, a notification may be sent to a user indicating that decoding has stopped. In some cases, this notification can allow the user to choose between options such as, for example, ending the call or continuing the call without decoding. Additionally, instructions for making this determination can be stored in the decoding settings 160 and may be input by a user.

In some embodiments, automatically selecting speech-to-text engines 120 of different speeds during speech decoding can help call centers handle large volumes of calls. There may be times when a call center is especially busy, necessitating greater processing power to handle the greater number of calls. In one example, a call center may have speech-to-text engines 120 available at varying speeds. At times, the call center may receive more calls than they have speech-to-text engines 120, taxing the system's ability to decode each call. In cases such as these, calls that speech-to-text engines 120 are unable to decode with sufficient accuracy can be dropped or the decoding of those calls can be ceased.

Figure 4:
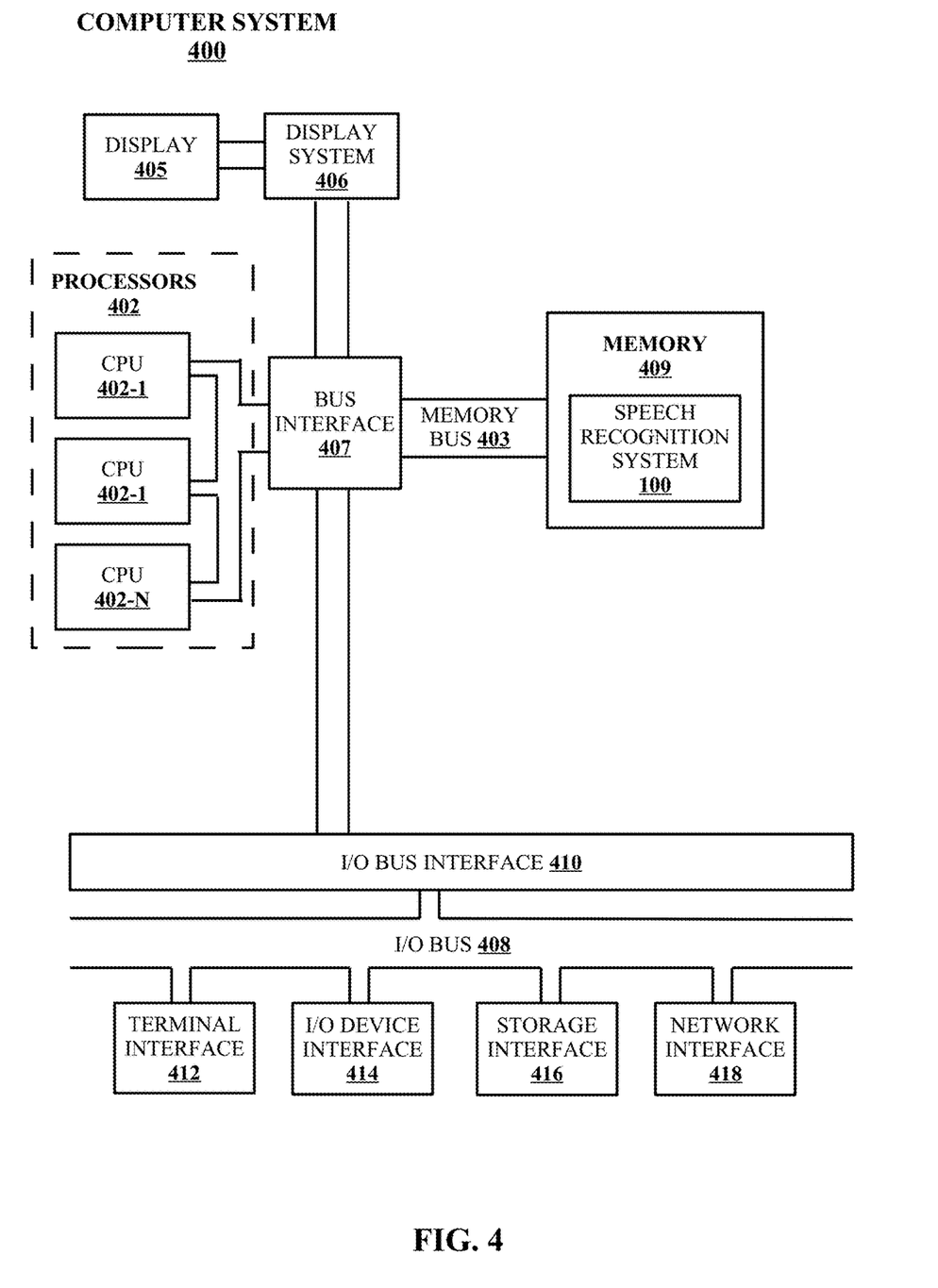
FIG. 4 is a block diagram illustrating a computer system, according to some embodiments of the disclosure.

FIG. 4 is a high-level block diagram illustrating an example computer system 400 that can be used in implementing one or more of the methods, tools, and components, and any related functions, described herein (e.g., using one or more processor circuits or computer processors of the computer), in accordance with embodiments of the present disclosure. In some embodiments, the major components of the computer system 400 may comprise one or more processors 402, a memory subsystem 409, a terminal interface 412, a storage interface 416, an I/O (input/output) device interface 414, and a network interface 418, all of which may be communicatively coupled, directly or indirectly, for inter-component communication via a memory bus 403, an I/O bus 408, bus interface unit 407, and an I/O bus interface unit 410.

The computer system 400 may contain one or more general-purpose programmable central processing units (CPUs) 402-1, 402-2, and 402-N, herein generically referred to as the CPU 402. In some embodiments, the computer system 400 may contain multiple processors typical of a relatively large system; however, in other embodiments the computer system 400 may alternatively be a single CPU system. Each CPU 402 may execute instructions stored in the memory subsystem 409 and may include one or more levels of on-board cache.

The memory 409 may include a random-access semiconductor memory, storage device, or storage medium (either volatile or non-volatile) for storing or encoding data and programs. In some embodiments, the memory 409 represents the entire virtual memory of the computer system 400, and may also include the virtual memory of other computer systems coupled to the computer system 400 or connected via a network. The memory 409 is conceptually a single monolithic entity, but in other embodiments the memory 409 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. The memory 409 may also store a speech recognition system 100. The speech recognition system 100 may include one or more channels (e.g., 102-1, 102-2, 102-N of FIG. 1) for recording audible input 101, one or more speech-to-text engines (e.g., 120-1, 120-2, 120-3, 120-4, 120-N in FIG. 1), a speech-to-text selection component (e.g., 130, in FIG. 1), an accuracy testing component (e.g., 140 in FIG. 1) an output comparison component, and decoding settings (e.g., 160 in FIG. 1).

While the speech recognition system 100 is illustrated as being included within the memory 409 in the computer system 400, in other embodiments, the speech recognition system 100 can be embodied in or among one or more different computer systems and can be accessed remotely, e.g., via a network. The computer system 400 may use virtual addressing mechanisms that allow the programs of the computer system 400 to behave as if they only have access to a large, single storage entity instead of access to multiple, smaller storage entities. Thus, while the speech recognition system is illustrated as being included within the memory 409, it is not necessarily completely contained in the same storage device at the same time. Further, although the components of the speech recognition system 100 can be separate entities, in other embodiments some of these components, portions of some of these components, or all of these components may be packaged together.

In an embodiment, the speech recognition system 100 may include instructions that execute on the processor 402 or instructions that are interpreted by instructions that execute on the processor 402 to carry out the functions as further described in this disclosure. In another embodiment, the speech recognition system 100 is implemented in hardware via semiconductor devices, chips, logical gates, circuits, circuit cards, and/or other physical hardware devices in lieu of, or in addition to, a processor based system. In another embodiment, the speech recognition system 100 may include data in addition to instructions.

Although the memory bus 403 is shown in FIG. 4 as a single bus structure providing a direct communication path among the CPUs 402, the memory subsystem 409, the display system 406, the bus interface 407, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 400 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

The computer system 400 may include a bus interface unit 407 to handle communications among the processor 402, the memory 409, a display system 406, and the I/O bus interface unit 410. The I/O bus interface unit 410 may be coupled with the I/O bus 408 for transferring data to and from the various I/O units. The I/O bus interface unit 410 communicates with multiple I/O interface units 412, 414, 416, and 418, which are also known as I/O processors (IOPs) or I/O adapters (IOAs), through the I/O bus 408. The display system 406 may include a display controller. The display controller may provide visual, audio, or both types of data to a display device 405. The display system 406 may be coupled with a display device 405, such as a standalone display screen, computer monitor, television, or a tablet or handheld device display. In alternate embodiments, one or more of the functions provided by the display system 406 may be on board a processor 402 integrated circuit. In addition, one or more of the functions provided by the bus interface unit 407 may be on board a processor 402 integrated circuit.

In some embodiments, the computer system 400 may be a multi-user mainframe computer system, a single-user system, or a server computer or similar device that has little or no direct user interface, but receives requests from other computer systems (clients). Further, in some embodiments, the computer system 400 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 400. In some embodiments, however, individual components may have greater or lesser complexity than as represented in FIG. 4, components other than or in addition to those shown in FIG. 4 may be present, and the number, type, and configuration of such components may vary.

In some embodiments, the speech-to-text engine selection processes described herein can be implemented in a cloud computing environment, which is described below with respect to FIGS. 5 and 6. It is to be understood that although this disclosure includes a detailed description of cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
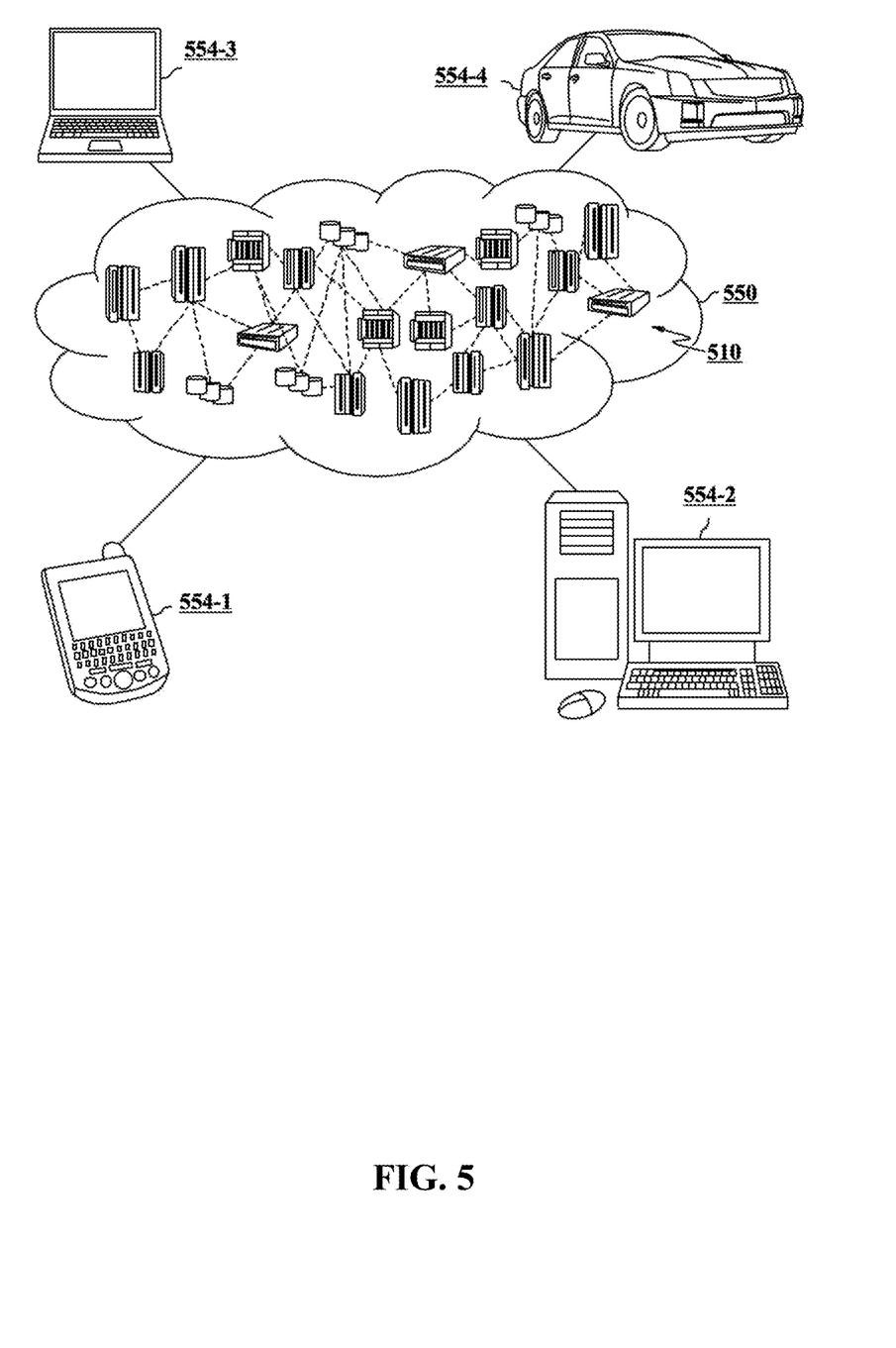
FIG. 5 is a diagrammatic illustration of a cloud computing environment, according to some embodiments of the disclosure

Referring now to FIG. 5, a diagrammatic illustration of a cloud computing environment 550 is depicted. As shown, cloud computing environment 550 includes one or more cloud computing nodes 510 with which local computing devices used by cloud consumers, such as, for example, personal digital assistant (PDA) or cellular telephone 554-1, desktop computer 554-2, laptop computer 554-3, and/or automobile computer system 554-4 may communicate. Nodes 510 may communicate with one another. They may be grouped (not shown) physically or virtually, in one or more networks, such as Private, Community, Public, or Hybrid clouds as described hereinabove, or a combination thereof. This allows cloud computing environment 550 to offer infrastructure, platforms and/or software as services for which a cloud consumer does not need to maintain resources on a local computing device. It is understood that the types of computing devices 554-1-554-4 shown in FIG. 5 are intended to be illustrative only and that computing nodes 510 and cloud computing environment 550 can communicate with any type of computerized device over any type of network and/or network addressable connection (e.g., using a web browser).

Figure 6:
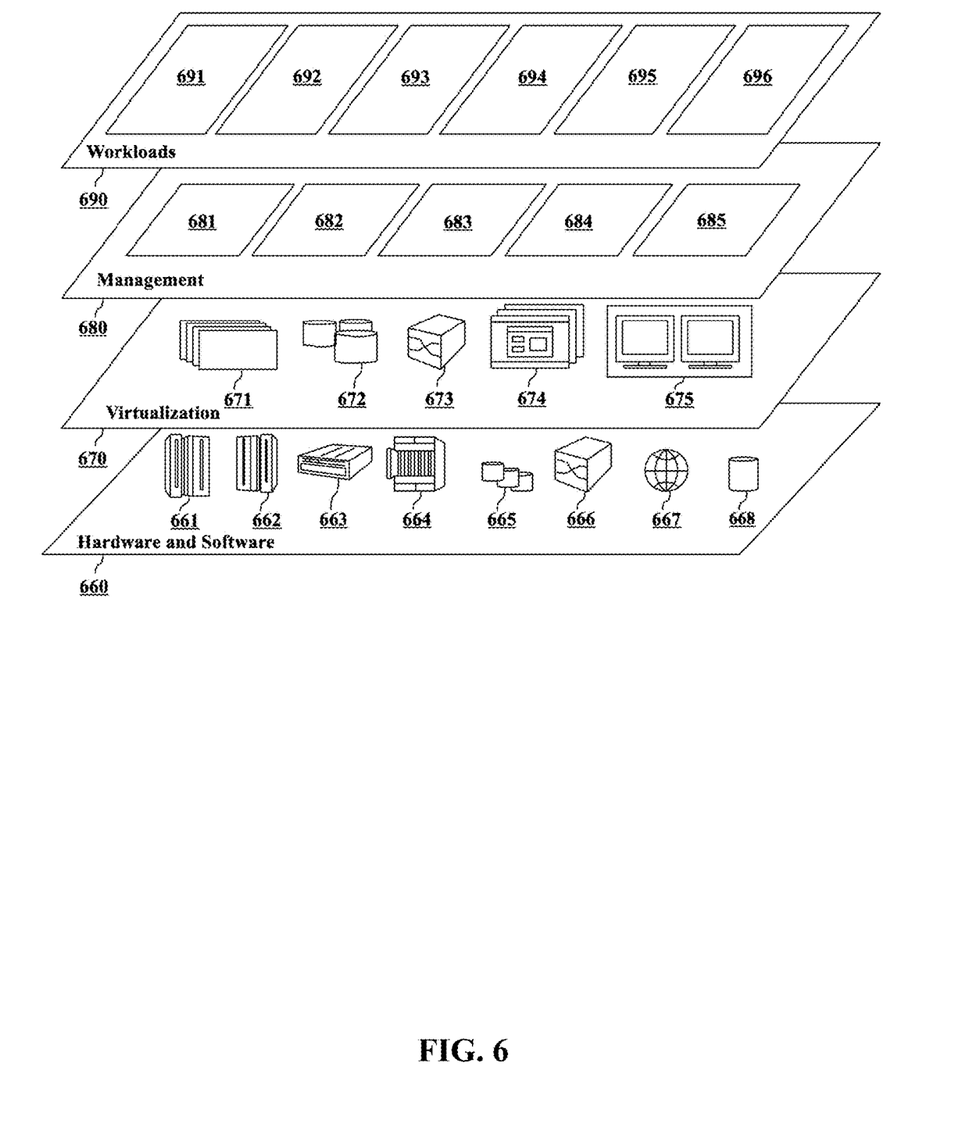
FIG. 6 is a diagrammatic illustration of abstraction model layers, according to some embodiments of the disclosure.

Referring now to FIG. 6, a diagrammatic illustration of a set of functional abstraction layers provided by cloud computing environment 550 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and speech-to-text engine selection 696.

As discussed in more detail herein, it is contemplated that some or all of the steps of some of the embodiments of methods described herein may be performed in alternative orders or may not be performed at all; furthermore, multiple steps may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out steps of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and step of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out steps of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and step of possible implementations of systems, methods, and computer program products according to various embodiments of the present disclosure. In this regard, each block in the flowchart or block diagrams may represent a component, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of selecting a speech-to-text engine, comprising:

receiving computer-readable speech data;

selecting, at a first predetermined time, a first set of at least two speech-to-text engines to decode a first portion of the computer-readable speech data, wherein the first predetermined time is stored in adjustable decoding settings;

decoding simultaneously, for a predetermined duration, the first portion of the computer-readable speech data with the first set of at least two speech-to-text engines wherein the predetermined duration is stored in the adjustable decoding settings;

determining an accuracy of decoding for each of the first set of at least two speech-to-text engines;

selecting a speech-to-text engine from the first set of at least two speech-to-text engines to decode second portion of the computer-readable speech data;

decoding the second portion of the computer-readable speech data with the speech-to-text engine selected from the first set of the at least two speech-to-text engines;

selecting, at a second predetermined time, a second set of at least two speech-to-text engines to decode a third portion of the computer readable speech data, wherein the second predetermined time is stored in the adjustable decoding settings;

decoding simultaneously, for the predetermined duration, the third portion of the computer-readable speech data with the second set of at least two speech-to-text engines;

determining an accuracy of decoding for each of the second set of at least two speech-to-text engines;

selecting a speech-to-text engine from the second set of at least two speech-to-text engines to decode a fourth portion of the computer-readable speech data; and decoding the fourth portion of the computer-readable speech data with the speech-to-text engine selected from the second set of at least two speech-to-text engines.

2. The method of claim 1, wherein the computer-readable speech data is spoken language recorded during a telephone call.

3. The method of claim 1, wherein a speed of decoding of a first one of the first set of at least two speech-to-text engines differs from a second one of the first set of at least two speech-to-text engines.

4. The method of claim 1, wherein an accuracy of decoding of a first one of the first set of at least two speech-to-text engines differs from a second one of the first set of at least two speech-to-text engines.

5. The method of claim 1, wherein the selecting the speech-to-text engine from the first set of at least two speech-to-text engines selects a speech-to-text engine having a higher accuracy of decoding.

6. The method of claim 1, wherein the selecting the speech-to-text engine from the first set of at least two speech-to-text engines selects a speech-to-text engine that meets or exceeds a speed threshold.

7. The method of claim 1, wherein the selecting the speech-to-text engine from the first set of at least two speech-to-text engines selects a speech-to-text engine that meets or exceeds an accuracy threshold.

8. The method of claim 1, further comprising decoding simultaneously a predetermined number of subsequent portions of the computer-readable speech data with at least two subsequently selected speech-to-text engines at periodic intervals of a predetermined duration, wherein the number of subsequent portions and the predetermined interval duration are stored in the adjustable decoding settings.

9. The method of claim 1, wherein the at least two speech-to-text engines convert the computer-readable speech data to text data.

10. A system comprising:
at least one processor;
at least one memory component;
at least two speech-to-text engines configured to decode computer-readable speech data, wherein the speech-to-text engines decode the computer-readable speech data for a predetermined duration that is stored in adjustable decoding settings;
an accuracy testing component configured to determine an accuracy of decoding for each of the at least two speech-to-text engines; and
an output comparison component configured to determine a difference in the accuracy of decoding of the at least two speech-to-text engines; and
an engine selection component configured to select at least one of the at least two speech-to-text engines to decode the computer-readable speech data based, at least in part, on the difference in the accuracy of decoding of the at least two speech-to-text engines determined by the output comparison component, wherein the engine selection component selects the at least one of the at least two speech-to-text engines at least one predetermined time that is stored in the adjustable decoding settings.

11. The system of claim 10, wherein a speed of decoding of a first one of the at least two speech-to-text engines differs from a second one of the at least two speech-to-text engines.

12. The system of claim 10, wherein an accuracy of decoding of a first one of the at least two speech-to-text engines differs from a second one of the at least two speech-to-text engines.

13. The system of claim 10, wherein the engine selection component selects a speech-to-text engine having a higher accuracy of decoding.

14. The system of claim 10, wherein the engine selection component selects a speech-to-text engine that meets or exceeds a speed threshold.

15. The system of claim 10, wherein the engine selection component selects a speech-to-text engine that meets or exceeds an accuracy threshold.

16. The system of claim 10, further configured to decode simultaneously a predetermined number of subsequent portions of the computer-readable speech data with the at least two speech-to-text engines at periodic intervals of a predetermined duration, wherein the number of subsequent portions and the predetermined interval duration are stored in the adjustable decoding settings.

17. A computer program product for selecting a speech-to-text engine, the computer program product comprising a computer readable storage medium having program instructions embodied therewith, the program instructions executable by a processor to cause the device to perform a method comprising:
receiving computer-readable speech data;
selecting, at a first predetermined time, a first set of at least two speech-to-text engines to decode a first portion of the computer-readable speech data, wherein the first predetermined time is stored in adjustable decoding setting;
decoding simultaneously, for a predetermined duration, the first portion of the computer-readable speech data with the first set of at least two speech-to-text engines, wherein the predetermined duration is stored in the adjustable decoding settings;
determining an accuracy of decoding for each of the first set of at least two speech-to-text engines;
selecting a speech-to-text engine from the first set of at least two speech-to-text engines to decode a second portion of the computer-readable speech data;
decoding the second portion of the computer-readable speech data with the speech-to-text engine selected from the first set of at least two speech-to-text engines;
selecting, at a second predetermined time, a second set of at least two speech-to-text engines to decode a third portion of the computer-readable speech data, wherein the second predetermined time is stored in the adjustable decoding settings;
decoding simultaneously, for the predetermined duration, the third portion of the computer-readable speech data with the second set of at least two speech-to-text engines;
determining an accuracy of decoding for each of the second set of at least two speech-to-text engines;

selecting a speech-to-text engine from the second set of at least two speech-to-text engines to decode a fourth portion of the computer-readable speech data; and decoding the fourth portion of the computer-readable speech data with the speech-to-text engine selected from the second set of at least two speech-to-text engines.

18. The computer program product of claim 17, wherein an accuracy of decoding of a first one of the first set of at least two speech-to-text engines differs from a second one of the first set of at least two speech-to-text engines.

19. The computer program product of claim 17, wherein the selecting the speech-to-text engine from the first set of at least two speech-to-text engines selects a speech-to-text engine having a higher accuracy of decoding.

20. The computer program product of claim 17, further comprising decoding simultaneously a predetermined number of subsequent portions of the computer-readable speech data with at least two subsequently selected speech-to-text engines at periodic intervals of a predetermined duration, wherein the number of subsequent portions and the predetermined interval duration are stored in the adjustable decoding settings.

\* \* \* \* \*